April 4, 1961     H. B. PULLAR     2,978,351
PAVING COMPOSITION
Filed May 28, 1958
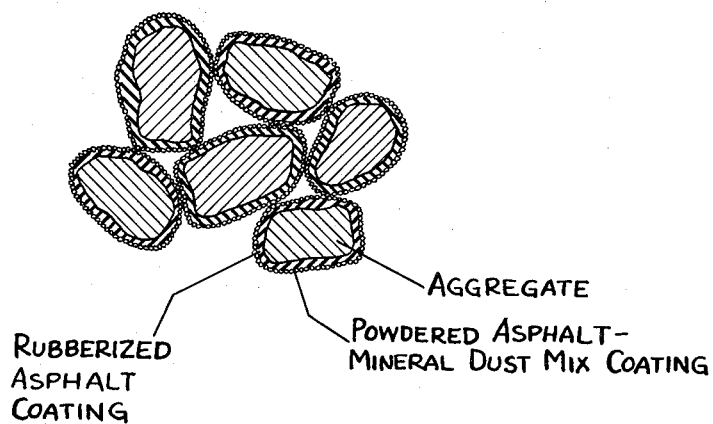
INVENTOR.
HAROLD B PULLAR
BY
*Gary, Desmond & Parker*
ATTYS.

United States Patent Office

2,978,351
Patented Apr. 4, 1961

2,978,351

PAVING COMPOSITION

Harold B. Pullar, Box 800, Magnolia, Ark.

Filed May 28, 1958, Ser. No. 738,297

3 Claims. (Cl. 117—32)

This invention relates to the production of paving compositions suitable for compaction in the cold.

The composition of the present invention is particularly advantageous because of its solvent-free character and therefore enhanced storage stability. It is further characterized by the employment of a rubberized asphalt of a special character and of a high aggregate content.

This invention further relates to the method for producing a storage-stable asphalt-coated mineral aggregate particle composition, containing a minor amount by weight of rubber material, which can be laid cold in various thicknesses and be compacted readily by the use of rollers, vibrating tampers, or other equipment giving satisfactory compression.

A characterizing component of the composition of the present invention is the employment of mineral aggregate graded in order to give good stability, varying in size from a maximum of ½-inch to dust, and preferably a fine aggregate mixture all of which just pass a 10 mesh screen and vary in size to fine dust, and graded therebetween in size so as to give stability to the final composition and pavement produced therefrom.

A characterizing component of the present invention, which is used in the proportions of from about 4% to about 8% by weight of the mineral aggregate, is rubberized asphalt, a composite of asphaltic material and unvulcanized rubber solids derived from a latex, the composite containing from about 1% to about 5% by weight of latex solids, and having a penetration at 77° F. (100 g. 5 sec.), of from about 50 to about 150. This component acts as a cement or binder on heating and mixing with the mineral aggregate, as hereinafter described, to provide good affinity, which would not be the case if asphalt alone were used. Further, as employed herein, a rubberized asphalt having, for example, an 85-100 penetration at 77° F., has a viscosity equivalent to a 30-40 penetration conventional asphalt.

It will be understood that reference to rubber herein, and in the following claims, is intended to include natural rubber and synthetic rubbers having similar physical properties of which the rubbery copolymers of butadiene with styrene or acrylonitrile, polybutadiene, polyisoprene, and their mixtures, are representative examples.

The rubberized asphalt employed may be prepared in known manner, such as for example by gradually adding a butadiene-styrene rubber copolymer latex to a molten body of asphalt of, for example, 100 penetration, with agitation and evaporation of the latex liquids to incorporate 2-3% by weight of rubber solids, with a resulting blend having a penetration of about 90-95. Another method is to first coprecipitate an aqueous slurry of powdered asphalt and latex to form composite particles composed of 90% by weight of asphalt and 10% by weight of rubber latex solids, and subsequently blend the composite particles by heat with a substantially equal amount by weight of a relatively softer asphalt to obtain a proportion of about 5% by weight of rubber and a 50-150 penetration, as desired.

Another method for preparing the rubberized asphalt component is to first combine about 10-15 parts by weight of latex solids, from a latex as aforesaid, with about 85-90 parts by weight of a normally liquid asphaltic oil such as "dispersion oil," a highly aromatic, heavy petroleum oil distillate, by combining a proportioned stream of latex with a proportioned stream of the oil heated to a temperature appreciably above the boiling point of water, to substantially volatilize the water content of the latex and to produce a bituminous material-rubber latex solids blend having a semisolid viscous character when cold. About 15 parts by weight of the foregoing is then mixed, by heating, with about 85 parts by weight of 50-60 penetration asphalt to result in a rubber-asphalt blend of 85-100 penetration having a rubber solids content of about 1.5-2.5% by weight.

The mineral aggregate can be composed of crushed stone such as granite and may contain crushed limestone, sand, slag, cinders and the like aggregate conventionally employed in paving compositions, but for the practice of the present invention should be well graded to give good and proper stability to the ultimate surface to be produced therefrom. The following are examples of suitably graded, crushed granite aggregates:

*Example A*

| | Weight percent |
|---|---|
| Passing 10 mesh | 100 |
| Passing 40 mesh and retained on 50 mesh | 15-30 |
| Passing 50 mesh and retained on 80 mesh | 20-40 |
| Passing 80 mesh and retained on 200 mesh | 15-30 |
| Passing 200 mesh | 5-15 |

*Example B*

| Sieve sizes (square openings): | Percent passing by weight |
|---|---|
| ½ inch | 100 |
| ⅜ inch | 85-100 |
| #8 | 65-80 |
| #16 | 50-70 |
| #30 | 35-60 |
| #50 | 25-48 |
| #100 | 15-30 |
| #200 | 6-12 |

The foregoing materials are combined, in accordance with the present invention, by first separately heating the mineral aggregate in a drum to a temperature in the range of from about 300-400° F. and separately heating the rubbarized asphalt to a liquefying temperature of from about 300 to about 400° F.

The rubber-asphalt material is heated to a minimum of 300° F. so that it will be a liquid adequate for mixing and distributing over the mineral aggregate, and to a maximum of 400° F. so as to prevent deterioration of the rubber.

The heated mineral aggregate is then transferred to a pug or any other suitable type of unheated blade mixer, followed by adding the rubberized asphalt with continued mixing until the liquefied rubber-asphalt coats the mineral aggregate particles. The mix is then discharged and permitted to cool to about 200° F.

While in this form and still tacky condition, the discharged material is dusted with finely divided particle material, all of which passes at 200 mesh screen and the majority of which passes a 350 mesh screen, so that after breaking up agglomerates of the coated mineral aggregate, and on cooling, the particles will remain in a friable condition and not stick together except under considerable pressure, such as rolling with either a conventional roller or a pneumatic type roller.

In carrying out this dusting step, about 5% by weight thereof of a dusting agent is applied and about 2 to 3% of this is recovered, with about 2 or 3% adhering. This filler material can be in whole or in part composed of barytes, slate flour, limestone dust, or any other relatively inert material.

This dusting composition preferably also contains up to 75% by weight of powdered asphalt, particularly when it is desired to increase the softening point of the coating, and a preferred dusting composition is one which contains from 25 to 75% by weight of either the asphalt or inert filler, and suitably the composition may be composed of equal parts of the two materials. The powdered asphalt component can be one which has a softening point between 250 and 350° F. and a penetration of between 0 and 5 at 77° F.

The powdered asphalt in the dusting component increases the softening point of the rubberzed asphalt coating to a desired extent and the filler acts primarily as a separating medium. The dusted composite, upon cooling, can be stored and packed for use as a commercial product which has long storage stability, since there are no volatiles therein to dry out.

In accordance with one specific example, the materials were combined as follows:

Example C

The mineral aggregate of Example A was heated to a temperature of 350° F. and then placed into a pug type mixer to which there was then added 7% by weight of rubberized asphalt of 89 penetration grade containing 2% by weight of rubber, preheated to a liquid condition at a temperature of about 350° F., and the mixing continued until the mineral aggregate particles were thoroughly coated with the liquefied rubberized asphalt, and a uniform mixture produced.

This mixture was then discharged from the pug mixer in a comparatively thin and looselike layer and then dusted with a mixture of equal parts of powdered asphalt and powdered barytes using approximately 5% by weight of this dusting material, approximately one-half of which was subsequently recovered, the remainder becoming adhered to the particle material. This dusting took place while the mixture was at a temperature of about 200° F., and had some surface tack, and until all the coated aggregate had been put in a loose, workable condition, producing a finished product which was reduced to particles all passing a 10 mesh screen.

The accompanying drawing is an enlarged diagrammatic sectional view of the product prepared in accordance with the foregoing example and illustrates storage-stable particles comprised of mineral aggregate coated with rubberized, relatively soft asphalt and an outermost adherent layer of mineral dust and powdered asphalt mix.

The mineral aggregate graded as in Example B can be similarly coated, but due to the over-all lesser surface area, a smaller amount such as 4 to 6% by weight of rubberized asphalt is adequate.

This material can then be packed into bags or containers and shipped in a loose, storage stable condition, capable of being subsequently spread and compacted in the cold to produce desirable surfaces of great stability, as aforesaid.

An example of the use of the foregoing composition is to spread in desired thickness on, for example, a prepared base of concrete, asphalt, or a stabilized gravel or macadam.

These bases should preferably be primed with the conventional rubber-asphalt primer such as a soft rubber-asphalt mixture of the type aforesaid, applied hot, or as a cold rubber-asphalt cutback. After the mixture has been spread to the proper thickness it can be compacted by rollers, tampers, or other suitable means of compression. In order to facilitate the compression, the surface can be spread with gasoline or naphtha, allowed to remain for ten minutes to one-half hour, depending upon the thickness of the surface and weather conditions, and the gasoline or naphtha allowed to evaporate. Immediately upon compression the surface can be opened to whatever traffic it will be subjected.

This high aggregate content composition has been found to be particularly useful for pavement patching.

I claim:

1. Cold compactable, loose, friable, storage-stable paving composition particles passing a 10 mesh screen, composed of mineral aggregate particles graded in size from those just passing a 10 mesh screen to those which pass a 200 mesh screen, a substantially uniform coating on said aggregate of from about 4% to about 8% by weight of rubberized asphalt having a rubber latex solids content of from about 1% to about 5% by weight and a penetration from about 50 to about 150 at 77° F., and an adherent surface layer composed of from about 2% to about 3% by weight of a mixture of discrete mineral dust and powdered asphalt particles in the proportion of from about 25% to about 75% by weight of mineral dust to from about 75% to about 25% by weight of powdered asphalt on said coated aggregate retaining the aggregate in the form of said loose, friable, storage-stable, compactable particle condition, and for raising the softening point of the asphaltic coating on the aggregate by amalgamation of said asphaltic materials on compaction.

2. Cold compactable, loose, friable, storage-stable paving composition particles composed of mineral aggregate particles graded in size from those just passing a ½-inch mesh screen to fine particles which pass a 200 mesh screen, all substantially uniformly coated with relatively soft rubberized asphalt, said coated aggregate particles including an adherent surface layer composed of from about 2% to about 3% by weight of a mixture of discrete mineral dust and powdered asphalt particles in the proportion of from about 25% to about 75% by weight of mineral dust to from about 75% to about 25% by weight of powdered asphalt retaining the coated aggregate in the form of said loose, friable, storage-stable, compactable particle condition and for raising the softening point of the asphaltic coating on the aggregate by amalgamation of said asphaltic materials on compaction.

3. Cold compactable, loose, friable, storage-stable paving composition particles composed of coarse graded mineral aggregate particles, a substantially uniform coating on said aggregate of relatively soft asphalt, and an adherent surface layer composed of from about 2% to about 3% by weight of a mixture of discrete mineral dust and powdered asphalt particles in the proportion of from about 25% to about 75% by weight of mineral dust to from about 75% to about 25% by weight of powdered asphalt on said coated aggregate retaining the aggregate in the form of said loose, friable, storage-stable, compactable particle condition and for raising the softening point of the asphaltic coating on the aggregate by amalgamation of said asphaltic materials on compaction.

References Cited in the file of this patent

UNITED STATES PATENTS

| Number | Name | Date |
|---|---|---|
| 732,663 | Stempel | June 30, 1903 |
| 1,218,218 | Schutte | Mar. 6, 1917 |
| 1,390,194 | Burdge | Sept. 6, 1921 |
| 1,758,913 | Sadtler | May 13, 1930 |
| 1,911,761 | Loomis et al. | May 30, 1933 |
| 2,700,655 | Endres | Jan. 25, 1955 |
| 2,807,596 | Flickinger | Sept. 24, 1957 |
| 2,809,179 | Endres et al. | Oct. 8, 1957 |